(12) United States Patent
Ress, Jr. et al.

(10) Patent No.: US 6,428,271 B1
(45) Date of Patent: Aug. 6, 2002

(54) COMPRESSOR ENDWALL BLEED SYSTEM

(75) Inventors: Robert A. Ress, Jr., Carmel; Jeffrey L. Hansen, Indianapolis, both of IN (US)

(73) Assignee: Allison Advanced Development Company, Indianapolis, IN (US)

( * ) Notice: Subject to any disclaimer, the term of this patent is extended or adjusted under 35 U.S.C. 154(b) by 0 days.

(21) Appl. No.: 09/527,438

(22) Filed: Mar. 16, 2000

Related U.S. Application Data (63) Continuation of application No. PCT/US99/04319, filed on Feb. 26, 1999.
(60) Provisional application No. 60/076,026, filed on Feb. 26, 1998.

(51) Int. Cl.$^7$ .............................................. F04D 29/70
(52) U.S. Cl. ..................................... 415/169.1; 415/914
(58) Field of Search .............................. 415/169.1, 914, 415/77

(56) References Cited

U.S. PATENT DOCUMENTS

| | | | |
|---|---|---|---|
| 1,302,282 A | * | 4/1919 | Baumann ..................... 415/77 |
| 2,520,697 A | | 8/1950 | Smith |
| 2,693,904 A | | 11/1954 | Boyd |
| 2,738,921 A | | 3/1956 | Hausmann |
| 2,848,156 A | | 8/1958 | Oppenheimer |
| 2,958,456 A | | 11/1960 | Forshaw |
| 3,142,438 A | | 7/1964 | McKenzie |
| 3,248,081 A | | 4/1966 | Bobo et al. |
| 3,262,635 A | | 7/1966 | Smuland |
| 3,597,106 A | | 8/1971 | Anderson et al. |
| 3,632,223 A | | 1/1972 | Hampton et al. |
| 3,846,038 A | | 11/1974 | Carriere et al. |
| 3,945,759 A | | 3/1976 | Bobo |
| 3,966,355 A | | 6/1976 | Pierpoline |
| 3,993,414 A | | 11/1976 | Meauze et al. |
| 4,146,352 A | | 3/1979 | Yasugahira et al. |
| 4,156,344 A | | 5/1979 | Cuthbertson et al. |
| 4,335,995 A | | 6/1982 | Riollet et al. |
| 4,362,465 A | | 12/1982 | Riollet et al. |
| 4,419,045 A | | 12/1983 | Andre et al. |
| 4,534,701 A | | 8/1985 | Wisser |
| 4,761,116 A | | 8/1988 | Braddy et al. |
| 4,969,326 A | | 11/1990 | Blessing et al. |
| 5,209,633 A | | 5/1993 | McGreehan et al. |
| 5,232,338 A | | 8/1993 | Vincent de Paul et al. |
| 5,275,531 A | | 1/1994 | Roberts |
| 5,520,508 A | | 5/1996 | Khalid |
| 5,531,565 A | | 7/1996 | Meindl et al. |
| 5,586,859 A | | 12/1996 | Nolcheff |
| 5,743,493 A | | 4/1998 | McCaughan |
| 5,904,470 A | | 5/1999 | Kerrebrock et al. |

FOREIGN PATENT DOCUMENTS

| | | |
|---|---|---|
| FR | 1012339 | 4/1952 |
| GB | 2192229 A | 8/1950 |

* cited by examiner

*Primary Examiner*—John Kwon
(74) *Attorney, Agent, or Firm*—Woodard, Emhardt, Naughton, Moriarty & McNett

(57) ABSTRACT

A compression system endwall bleed system having a plurality of bleed slots formed in a mechanical housing downstream of a rotating shrouded rotor. In one embodiment, the plurality of bleed slots bleed off a separated tip boundary layer to relieve back pressure associated with this blockage. A sealing structure downstream of the shrouded rotor is utilized to minimize working fluid leakage ahead of the plurality of bleed slots.

27 Claims, 7 Drawing Sheets

COMPRESSOR ENDWALL BLEED SYSTEM

CROSS-REFERENCE TO RELATED APPLICATIONS

The present application is a continuation of PCT/US 99/04319 filed Feb. 26, 1999 application which is currently pending and incorporated herein by reference. The PCT/US 99/04319 application claims the benefit of U.S. Provisional Patent Application No. 60/076,026 filed Feb. 26, 1998 now abandoned.

This invention was made with U.S. Government support under contract F33615-95-C-2502 awarded by the United States Air Force.

BACKGROUND OF THE INVENTION

The present invention relates generally to the field of gas turbine engines and more particularly in one embodiment the present invention defines an endwall bleed system to remove a separated boundary layer downstream of a rotating compressor tip shroud. Although the present invention was developed for a gas turbine engine, certain applications may be outside of this field.

A gas turbine engine is typical of the type of turbomachinery in which the present inventions described herein may be advantageously employed. It is well known that a gas turbine engine conventionally comprises a compressor for compressing the inlet air to an increased pressure for combustion in a combustor chamber. The mixture of fuel and the increased pressure air is burned in the combustor chamber to generate a high temperature gaseous flow stream for causing rotation of the turbine blades within a turbine. Further, the high temperature gaseous flow stream may be used directly as a thrust for providing motive power such as in a turbine jet engine.

A gas turbine engine including a shrouded compressor rotor is believed well known to gas turbine engine designers. Shrouded compressor rotors can be likened to a compressor rotor with no tip clearance. Tip clearance is generally defined as a space between the tip of the compressor blade and an opposing wall member. It has been shown that a rotor with no tip clearance has poorer performance than a rotor with a small amount of tip clearance, such as a tip clearance equal to about one percent of the compressor blade span. In many prior compressor systems utilizing a shrouded rotor, a large three dimensional boundary layer separation occurs at the tip endwall and suction surface corner. This large boundary layer separation dominates the losses and stall inception mechanism for the compressor rotor.

Heretofore, there has been a need for a method and apparatus for removing at least a portion of the separated boundary layer downstream of a rotating compressor tip shroud. The present invention satisfies this and/or other needs in a novel and unobvious way.

SUMMARY OF THE INVENTION

One form of the present invention contemplates an endwall bleed system to remove at least a portion of a separated boundary layer downstream of a rotating compression system tip shroud.

Another form of the present invention contemplates a method for bleeding off a separated boundary layer from a rotating compression system tip shroud.

Yet another form of the present invention contemplates an endwall bleed system to remove a separated boundary layer downstream of a compression system tip shroud and relieve the back pressure associated therewith.

One aspect of the present invention contemplates a compression system for a gas turbine engine. The compression system, comprising: a mechanical housing; a wheel rotatable within the housing and having a plurality of blades coupled thereto; a shroud coupled to the plurality of blades so as to separate the fluid flow within the compression system into a core stream and a bypass stream, the shroud having a fore edge and an aft edge; a static wall member coupled to the mechanical housing and having a portion aligned with the aft edge of the shroud; and at least one bleed aperture formed in the wall member adjacent the aft edge of the shroud to allow the passage of fluid into the bypass system.

One object of the present invention is to provide a unique endwall bleed system for a gas turbine engine compression system.

These and other objects will become more apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
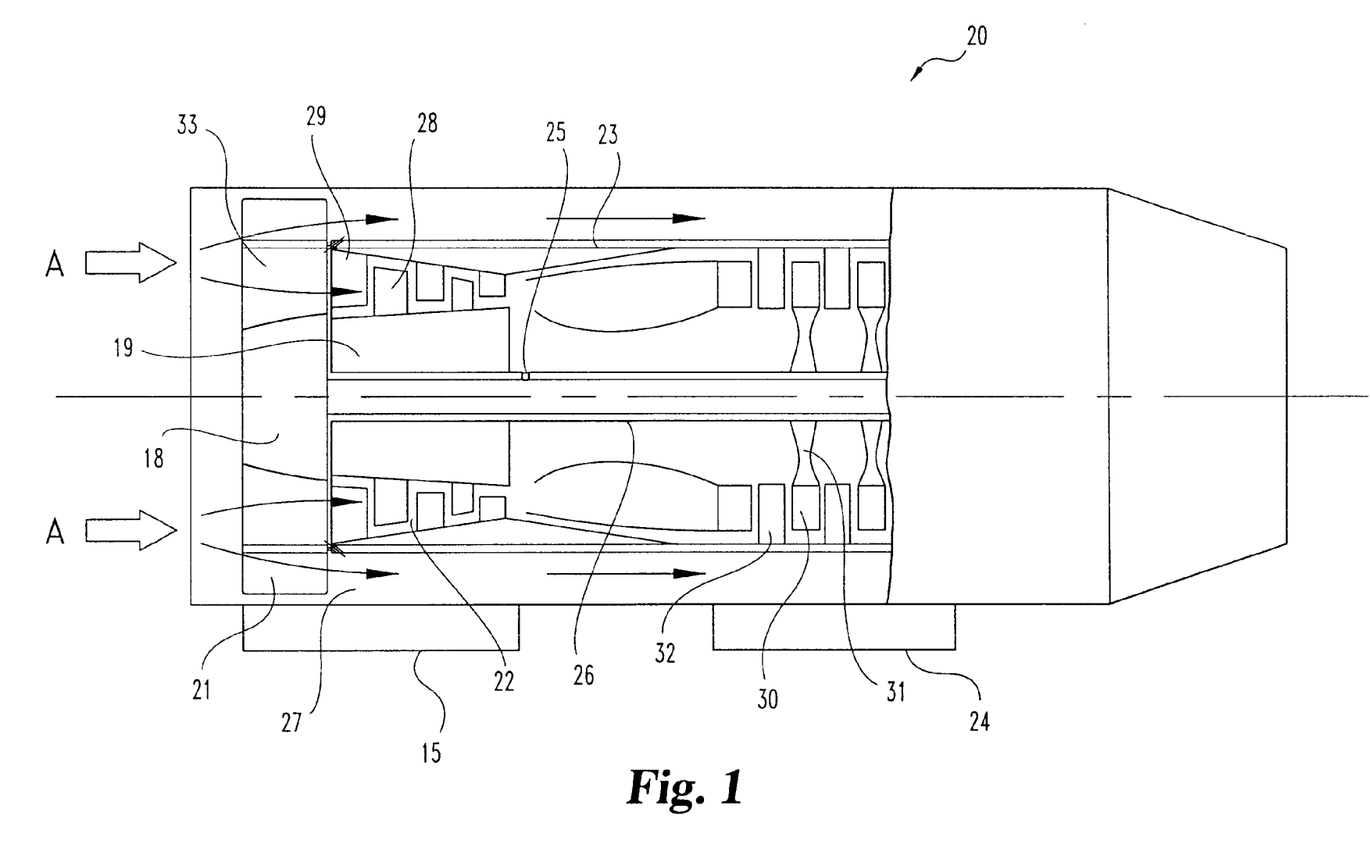
FIG. 1 is a schematic representation of a gas turbine engine.

Referring to FIG. 1, there is illustrated a schematic view of a gas turbine engine 20 which includes a compression system 15, a combustor section 23, and a turbine section 24 that are integrated together to produce an aircraft flight propulsion engine. In one form, the compression system 15 includes a fan section 21 and a compressor section 22. This type of gas turbine engine is generally referred to as a turbo-fan. One alternate form of a gas turbine engine includes a compressor, a combustor, and a turbine that have been integrated together to produce an aircraft flight propulsion engine without-the fan section. The term aircraft is generic and includes helicopters, airplanes, missiles, unmanned space devices and any other substantially similar devices. It is important to realize that there are a multitude of ways in which the gas turbine engine components can be linked together. Additional compressors and turbines could be added with intercoolers connecting between the compressors and reheat combustion chambers could be added between the turbines.

A gas turbine engine is equally suited to be used for an industrial application. Historically, there has been widespread application of industrial gas turbine engines, such as pumping sets for gas and oil transmission lines, electricity generation, and naval propulsion.

The compressor section 22 includes a rotor 19 having a plurality of compressor blades 28 coupled thereto. The rotor 19 is affixed to a shaft 25 that is rotatable within the gas turbine engine 20. A plurality of compressor vanes 29 are positioned within the compressor section 22 to direct the fluid flow relative to blades 28. Turbine section 24 includes a plurality of turbine blades 30 that are coupled to a rotor disk 31. The rotor disk 31 is affixed to the shaft 25, which is rotatable within the gas turbine engine 20. Energy extracted in the turbine section 24 from the hot gas exiting the combustor section 23 is transmitted through shaft 25 to drive the compressor section 22. Further, a plurality of turbine vanes 32 are positioned within the turbine section 24 to direct the hot gaseous flow stream exiting the combustor section 23.

The turbine section 24 provides power to a fan shaft 26, which drives the fan section 21. The fan section 21 includes a fan 18 having a plurality of fan blades 33. Air enters the gas turbine engine 20 in the direction of arrows A and passes through the fan section 21 into the compressor section 22 and a bypass duct 27. The term airfoil will be utilized herein to refer to fan blades, fan vanes, compressor blades, turbine blades, compressor vanes, and turbine vanes unless specifically stated otherwise in the text. Further details related to the principles and components of a conventional gas turbine engine will not be described herein as they are believed known to one of ordinary skill in the art.

Figure 2:
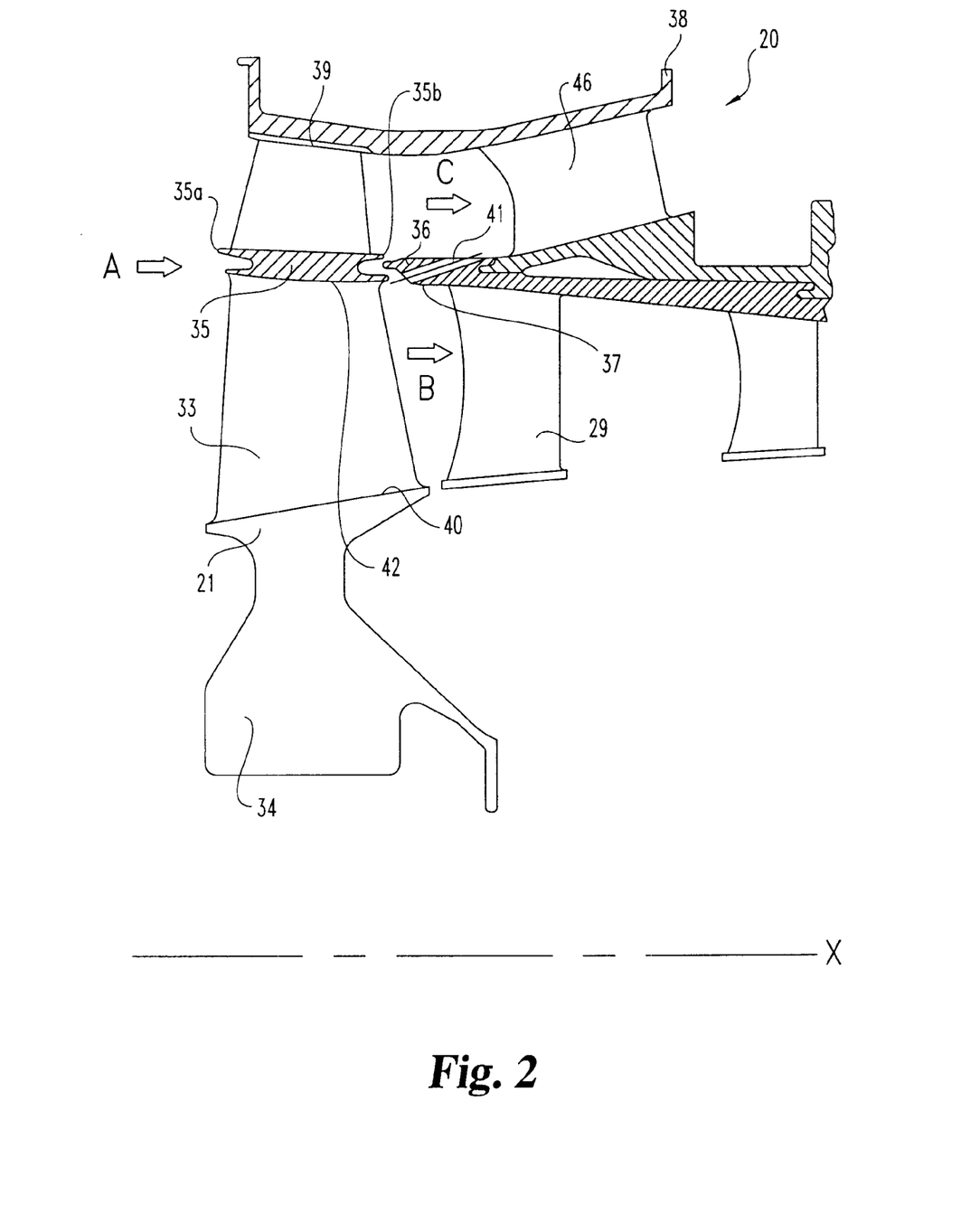
FIG. 2 is an illustrative view of one embodiment of a compression system endwall bleed system comprising a portion of a gas turbine engine with a fan stage.

Referring to FIG. 2, there is illustrated a portion of one embodiment of a compression system within a gas turbine engine 20. In one form of the present invention, the compression system comprises a portion of a variable cycle engine. However, the present invention is not limited to a variable cycle engine and would be applicable to any compression system within any gas turbine engine. The description of the present invention will be generally made with regard to the fan stage 21 of the compression system, however the application of the present invention to other stages/portions of the compression system are contemplated herein.

Fan stage 21 includes a plurality of blades 33 extending from a wheel 34. A circumferential extending shroud 35 separates the fluid flow A entering the gas turbine engine 20 into a core stream portion indicated by arrow B and a bypass stream portion indicated by arrow C. The shroud 35 having a fore edge 35a and an aft edge 35b. Shroud 35 is located between the tip 39 and an inner flow path surface 40. The location of the shroud 35 is not limited to the location illustrated in FIG. 2, and in alternate embodiments can be positioned anywhere along the span between inner flow path surface 40 and tip 39. Further, the present invention is not limited to integrally bladed wheels/rotors and includes wheels/rotors having insertable blades. Aft edge 35b is substantially aligned with a portion 36 of a static wall member 37 that is coupled to the mechanical housing 38 which surrounds the rotating components of the compressor 22.

In one embodiment, the endwall bleed system comprises a plurality of circumferentially spaced bleed apertures 41 that are located downstream of the aft edge 35b of the shroud 35. In a preferred form, the core side 42 of the shroud 35 is contoured to provide a smooth entry for fluid flow to the plurality of bleed apertures 41. Each of the plurality of bleed apertures 41 are designed and constructed to bleed off the separated tip boundary layer at the tip endwall and suction surface corner so as to relieve back pressure. The plurality of bleed apertures 41 define a passageway between the core stream portion B and the bypass stream portion C. In one embodiment the plurality of bleed apertures 41 discharge a part of the core stream portion B into the bypass stream portion C ahead of the bypass frame exit vane row 46.

Figure 3:
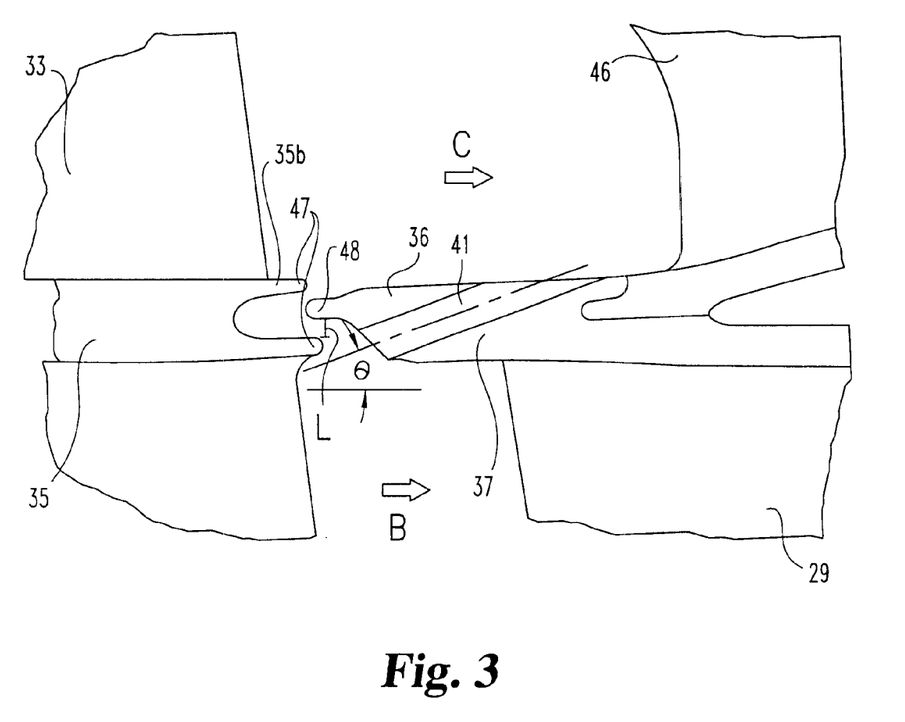
FIG. 3 is an enlarged view of a rotating-to-static seal comprising a portion of the FIG. 2, compression system endwall bleed system.

With reference to FIG. 3, there is illustrated an enlarged partial view of FIG. 2. In one embodiment a circumferentially extending winged portion 47 is positioned at the aft edge 35b of the shroud 35 and interfaces with a circumferentially extending forward projecting member 48 of the static wall 36. The interface between the winged portion 47 and the forward projecting member 48 is designed and constructed to minimize fluid leakage ahead of the plurality of bleed apertures 41. More specifically, in one embodiment, the spacing 'L' will decrease as the components are subjected to centrifugal loading and improve the sealing characteristics of the adjoining components.

The plurality of bleed apertures 41 is formed through portion 36 of the static wall member 37. In a preferred form, the plurality of bleed apertures 41 are formed at an angle through the portion 36 of the static wall member 37. In a more preferred form each of the plurality of bleed apertures is formed at a compound angle through the portion 36 of the static wall member 37. The compound angle of each of the plurality of bleed apertures is represented by a first angle $\theta$ and a second angle $\phi$ (see FIG. 5). Each of the angles being referenced form a centerline X. In one embodiment the first angle $\theta$ is in the range of about 10–20 degrees and the second angle $\phi$ is selected to substantially match the flow angle of the bypass stream. However, the present invention is not intended to be limited herein to the specific angles shown as other angles may be selected for specific design requirements.

Figure 4:
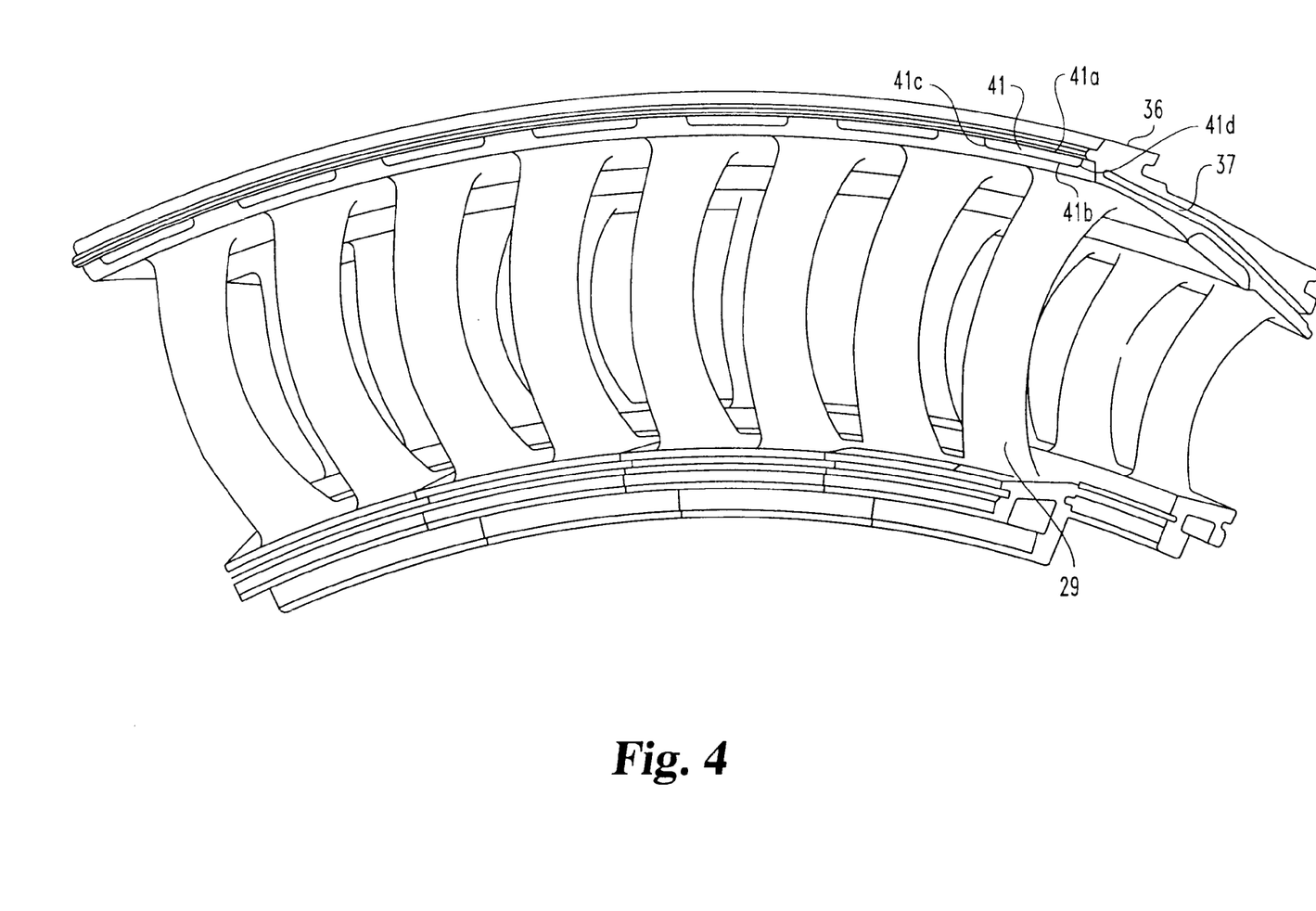
FIG. 4 is a forward-looking aft view of the plurality of endwall bleed apertures comprising a portion of the FIG. 2, compression system endwall bleed system.

With reference to FIG. 4, there is illustrated a forwarding looking aft view of the plurality of bleed apertures 41 formed through the portion 36 of the static wall member 37. In one embodiment each of the plurality of bleed apertures 41 defines a constant cross section over it's length and have an approximately rectangular cross section. However, other geometric cross sections are contemplated herein including but not limited to circular and elliptical. In one form of the present invention, the walls 41a and 41b defining aperture 41 are planar, however in another embodiment one or both of the walls are curvilinear. Further, the end walls 41c and 41d that define the aperture 41 are shown having a radius, however, in an alternate embodiment, the junction between the walls forming the apertures 41 define sharp corners. Further, the present invention is not intended herein to be limited to an aperture having a constant cross sectional area.

Figure 5:
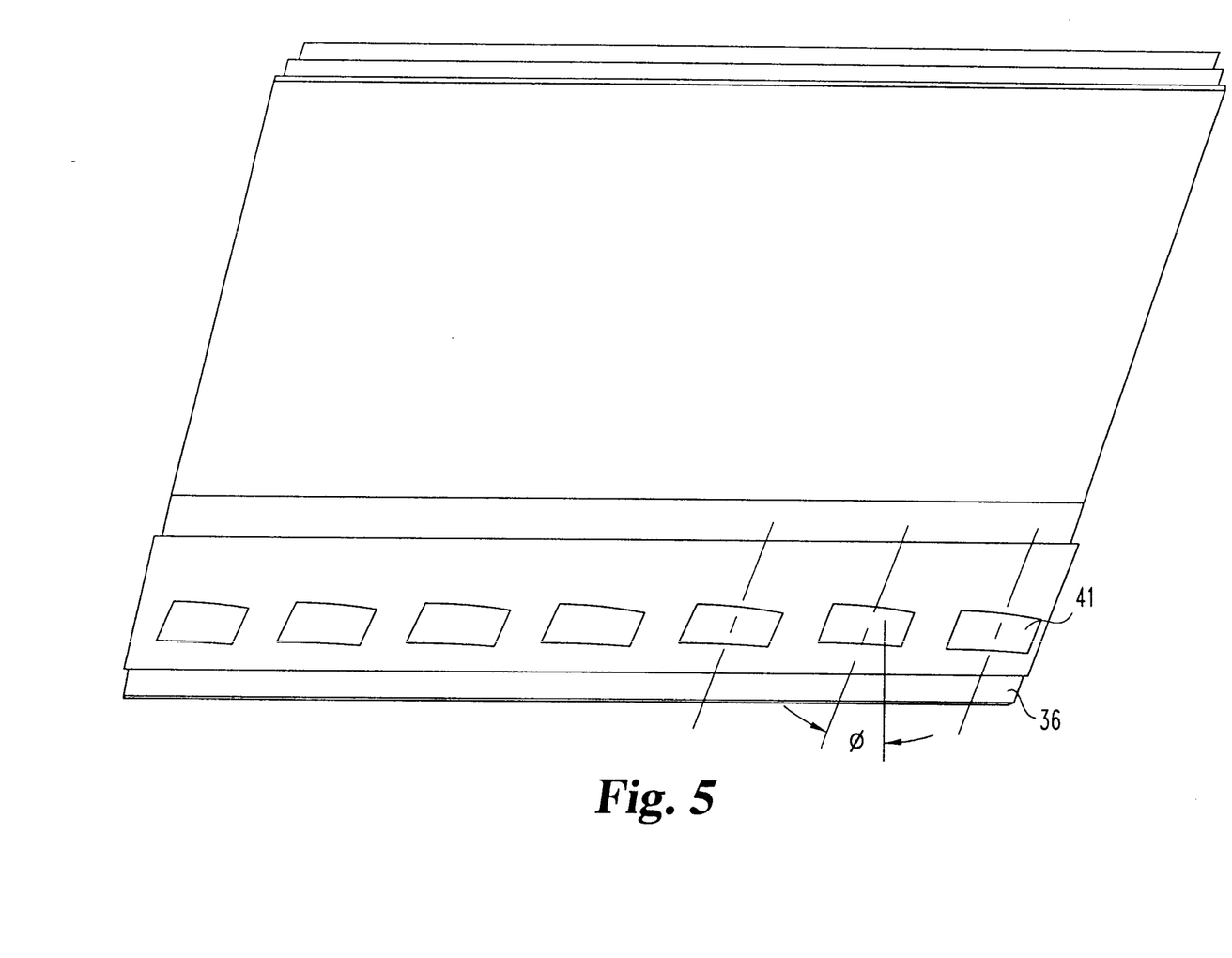
FIG. 5 is a top plan view of the discharge side of the plurality of bleed apertures comprising a portion of the FIG. 2, compression system endwall bleed system.

With reference to FIG. 5, there is illustrated a top plan view of the discharge side of the plurality of bleed apertures 41. The amount bled from each of the plurality of bleed apertures 41 is controlled by the cross-sectional area of the apertures and the static change in pressure across the aperture.

Figure 6A:
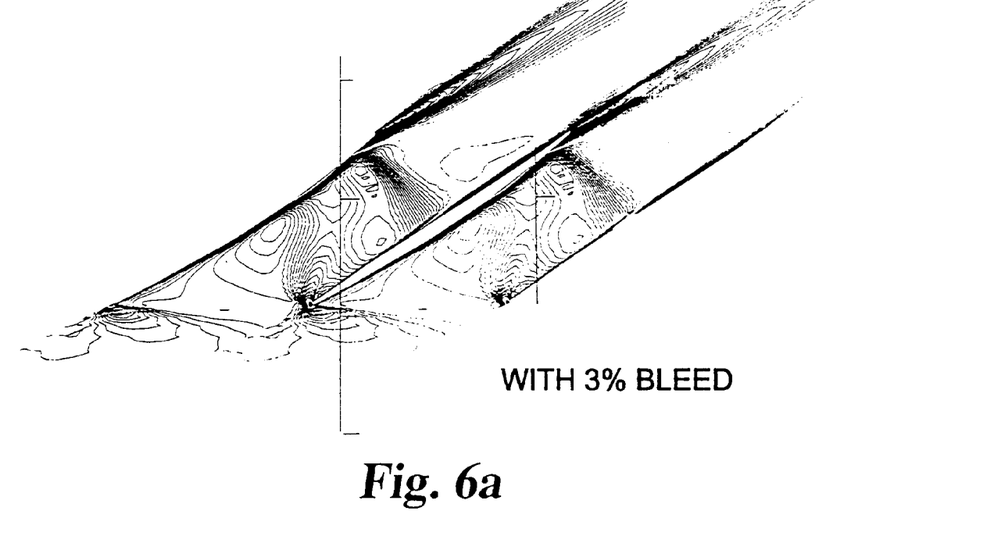
FIG. 6a is an output from a numerical evaluation using a three-dimensional viscous CFD code with bleed.
Figure 6B:
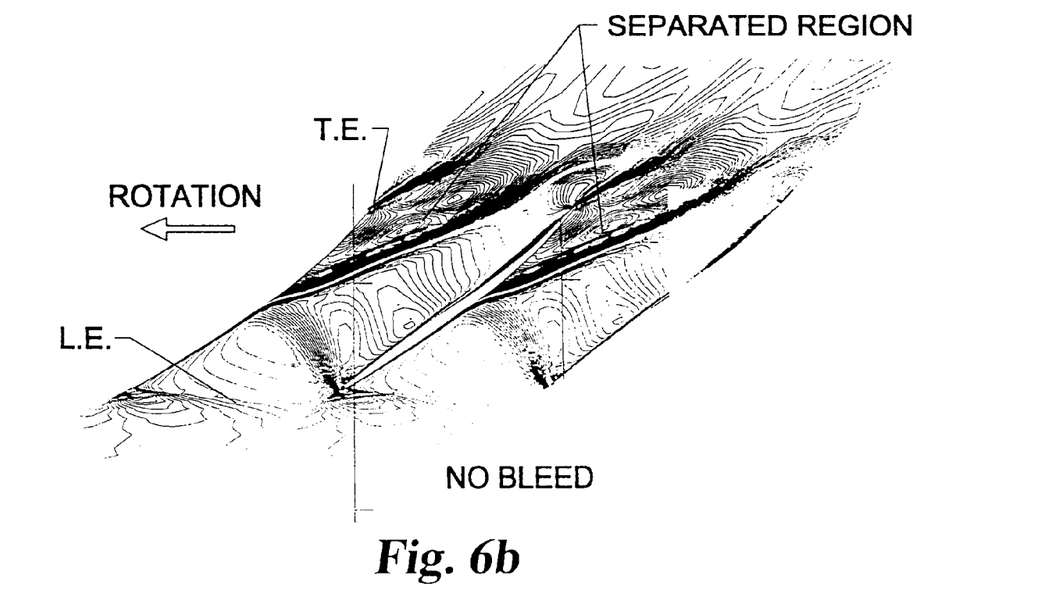
FIG. 6b is an output from a numerical evaluation using a three-dimensional viscous CFD code with no bleed.

With reference to FIGS. 6a and 6b, there is illustrated simulation output from a three-dimensional viscous CFD code. FIG. 6a presents the results of numerical evaluations using the 3D viscous CFD code with 3% bleed, and FIG. 6b presents the results of numerical evaluation using the 3D viscous CFD code with no bleed. The output includes predicted blade-to-blade mach number contours near the tip of a shrouded rotor with and without bleed. For the rotor with bleed, the design point efficiency was increased by 1% and the stall margin was increased by approximately 5%. It has been found that approximately 2% of the inlet fluid flow rate is required to sufficiently bleed off the boundary layer.

Figure 7:
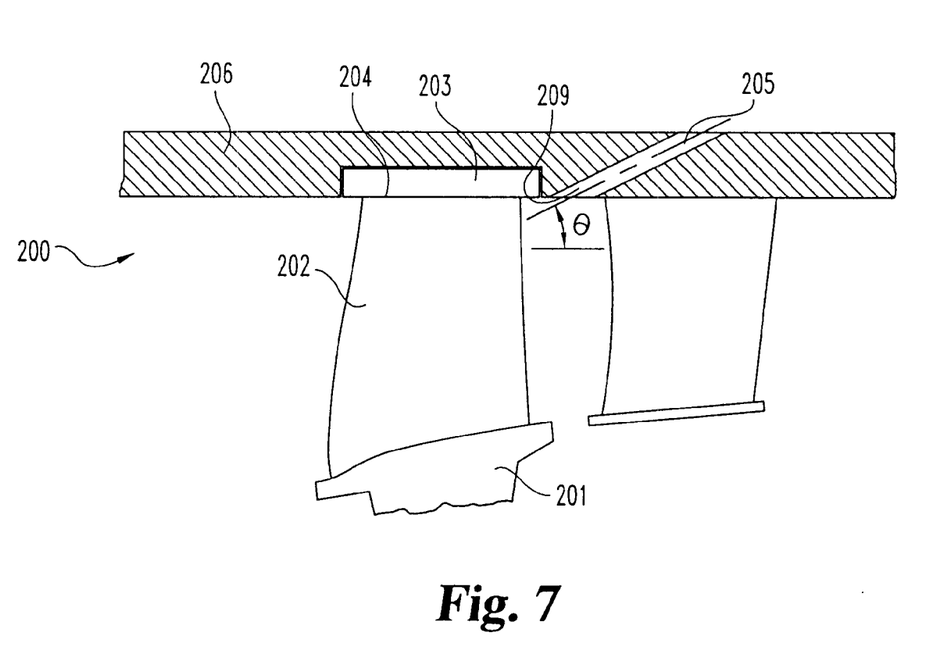
FIG. 7 is an illustrative view of another embodiment of a compression system endwall bleed system.

With reference to FIG. 7, there is illustrated a portion 200 of a compression system having a rotatable disk 201 with a plurality of blades 202 extending therefrom. More specifically, there is illustrated an endwall bleed system that is substantially similar to the endwall bleed system discussed previously. However, a circumferential shroud 203 does not divide the working fluid into multiple fluid flow streams. The circumferential shroud 203 is coupled between the plurality of blades 202 and is located at the tip end 204 of each of the plurality of blades 202. The rotation of the rotatable disk 201 and plurality of blades 202 creates a separated tip boundary layer that is bled off through an aperture 205. The removal of the flow disturbance is preferably accomplished through a plurality of spaced bleed apertures 205 formed through the mechanical housing 206. The portion of fluid bled off may be collected in a manifold or other structure and returned to the flow stream as cooling air or dumped into another portion of the gas turbine engine. Further, the bleed flow can also be dumped from the gas turbine engine.

The inlet 209 to the plurality of bleed apertures 205 bleeds the separated boundary layer off and passes it through passage 205 to the appropriate destination. Bleed apertures 205 are substantially similar to bleed apertures 41, however the bleed apertures 205 can generally utilize a larger first angle θ, and more preferably the first angle θ is in the range of about 10–90 degrees. However, the present invention is not intended to be limited to the angles shown as other angles may be selected to meet specific design requirements.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A compression system, comprising:
   a mechanical housing;
   a wheel rotatable within said housing, said wheel having a plurality of blades coupled thereto;
   a shroud coupled to said plurality of blades so as to separate fluid flow within the compression system into a core stream and a bypass stream, said shroud having a fore edge and an aft edge;
   a static wall member coupled to said mechanical housing and having a portion aligned with said aft edge of said shroud; and
   at least one bleed aperture formed in said wall member adjacent the aft edge of the shroud to allow the passage of fluid into the bypass system.

2. The compression system of claim 1, wherein said at least one bleed aperture defines a plurality of bleed apertures located immediately downstream of said aft edge.

3. The compression system of claim 1, wherein said bleed aperture has a constant cross-section and wherein said portion cooperates with said aft edge of said shroud to minimize fluid leakage ahead of said at least one bleed aperture.

4. The compression system of claim 3, wherein said at least one bleed aperture defines a plurality of bleed apertures and wherein said plurality of bleed apertures are formed at a compound angle in said wall member.

5. The compression system of claim 4, wherein each of said plurality of blades has a span with a tip at one end and wherein said shroud is located between said tip and an inner flow path surface, and wherein the passage of the fluid is adapted to remove the separated boundary layer downstream of said shroud.

6. The compression system of claim 1:
   wherein said at least one bleed aperture defines a plurality of apertures located immediately downstream of said aft edge;
   wherein each of said plurality of bleed apertures has a constant cross-section;
   wherein said plurality of bleed apertures are formed at a compound angle in said member; and
   wherein each of said plurality of blades has a tip and wherein said shroud is located between said tip and said wheel, and wherein the passage of the fluid is adapted to remove the separated boundary layer downstream of said shroud.

7. The compression system of claim 6, which further includes means for reducing fluid leakage ahead of said plurality of bleed apertures and wherein said wheel defines a portion of a fan stage.

8. A method, comprising:
   providing a gas turbine engine with a shrouded rotor therein;
   rotating the shrouded rotor relative to a mechanical housing within the gas turbine engine, whereby a tip boundary layer separation occurs;
   bleeding off at least a portion of the separated tip boundary layer; and
   passing the at least a portion of the separated tip boundary layer through an opening in a static wall member within the gas turbine engine.

9. The method of claim 8, which further includes separating a fluid flow into a first portion and a second portion with said shroud.

10. The method of claim 9, wherein in said passing the opening in the static wall member places the first portion and the second portion in fluid communication; and
    wherein said passing includes flowing a part of the first portion through said passage to the second portion.

11. The method of claim 10, wherein said bleeding relieves back pressure associated with the separated tip boundary layer.

12. The method of claim 11, which further includes minimizing the leakage of fluid between the first portion and the second portion ahead of the passage.

13. An apparatus, comprising:
    a gas turbine engine; and
    a compression system within said gas turbine engine, comprising:
    a mechanical structure;
    a member rotatable within said compression system relative to said mechanical structure;
    a plurality of blades coupled with and extending from said member;
    a shroud coupled to said blades and extending circumferentially around said member, said shroud separating the working fluid into a first working fluid portion and a second working fluid portion, and wherein said shroud has an aft edge; and at least one passage formed through said mechanical structure, said passage has an inlet proximate said aft edge and in fluid communication with the first working fluid portion and an outlet in fluid communication with the second working fluid portion and wherein said passage bleeds off a quantity of the first working fluid portion through said inlet and delivers through said outlet into the second working fluid portion.

14. The apparatus of claim 13, wherein said at least one passage defines a plurality of spaced passages.

15. The apparatus of claim 14, wherein each of said inlets is positioned downstream of said aft edge, and wherein said mechanical structure includes a circumferential member interfacing with a portion of said aft edge to reduce fluid leakage ahead of said plurality of spaced passages.

16. The apparatus of claim 15, wherein said circumferential member is continuous and wherein said aft edge includes a forked member.

17. The apparatus of claim 16, wherein at least one of said plurality of passages has a constant cross section and is formed at a compound angle through said mechanical structure.

18. The apparatus of claim 16, wherein at least one of said plurality of passages has a varying cross section and is formed at a compound angle through said mechanical structure.

19. The apparatus of claim 17, wherein said plurality of passages is uniformly spaced along said mechanical structures, and wherein said plurality of passages has a constant cross section and said plurality of passages are formed at a compound angle.

20. The apparatus of claim 13:

wherein said at least one passage defines a plurality of substantially uniformly spaced passages having a constant cross-section and formed at a compound angle through said mechanical structure;

which further includes means for minimizing leakage of said first working fluid portion into said second working fluid ahead of said plurality of passages; and said plurality of blades define fan blades within a fan stage of said compression system.

21. The apparatus of claim 13:

wherein said at least one passage defines a plurality of substantially uniformly spaced passages having a constant cross-section and formed at a compound angle through said mechanical structure;

which further includes means for minimizing leakage of said first working fluid portion into said second working fluid ahead of said plurality of passages;

said compression system includes a multistage compressor; and said plurality of passages have a generally rectangular cross section.

22. A compression system, comprising:

a mechanical housing having a wall member;

a rotor having a plurality of blades extending therefrom, said rotor positioned within and rotatable relative to said housing, each of said plurality of blades has a tip end;

a shroud coupled to said tip end of said plurality of blades and adjacent said mechanical housing, said shroud having a first edge and a second edge; and at least one bleed aperture formed in said wall member adjacent the first edge of said shroud to bleed off a separated tip boundary layer downstream of said first edge of said shroud.

23. The compression system of claim 22, wherein said at least one bleed aperture defines a plurality of bleed apertures located immediately downstream of said first edge.

24. The compression system of claim 23, wherein said plurality of bleed apertures is formed at an acute angle through said housing.

25. The compression system of claim 23, wherein at least one of said plurality of bleed apertures has a substantially constant cross section.

26. The compression system of claim 23 wherein said plurality of bleed apertures are formed at a compound angle through said housing.

27. The compression system of claim 4, wherein said compound angle is defined by a first angle $\theta$ and a second angle $\phi$, and wherein said first angle $\theta$ is in the range of about 10–90 degrees.

* * * * *